(12) United States Patent
Luo et al.

(10) Patent No.: US 8,574,786 B2
(45) Date of Patent: Nov. 5, 2013

(54) ANODE CATALYSTS FOR FUEL CELL MEMBRANE REACTORS

(75) Inventors: Jing-li Luo, Edmonton (CA); Xian-zhu Fu, Edmonton (CA); Nemanja Danilovic, Edmonton (CA); Karl T. Chuang, Edmonton (CA); Alan R. Sanger, Edmonton (CA); Andrzej Krzywicki, Calgary (CA)

(73) Assignees: The Governors of the University of Alberta, Edmonton, Alberta (CA); Nova Chemicals Corporation, Calgary, Alberta (CA)

( * ) Notice: Subject to any disclaimer, the term of this patent is extended or adjusted under 35 U.S.C. 154(b) by 296 days.

(21) Appl. No.: 13/024,249

(22) Filed: Feb. 9, 2011

(65) Prior Publication Data

US 2011/0212384 A1    Sep. 1, 2011

Related U.S. Application Data

(60) Provisional application No. 61/302,884, filed on Feb. 9, 2010.

(51) Int. Cl.
*H01M 4/90* (2006.01)

(52) U.S. Cl.
USPC .......................... 429/486; 429/527; 429/528

(58) Field of Classification Search
USPC ........... 429/486, 527, 528; 502/315, 318, 319
See application file for complete search history.

(56) References Cited

U.S. PATENT DOCUMENTS

| | | | |
|---|---|---|---|
| 4,642,303 A * | 2/1987 | Renken | 502/315 |
| 7,338,578 B2 | 3/2008 | Huang et al. | |
| 2003/0035989 A1 * | 2/2003 | Gorte et al. | 429/30 |
| 2008/0096079 A1 * | 4/2008 | Linderoth et al. | 429/33 |
| 2008/0152960 A1 | 6/2008 | Luo et al. | |
| 2011/0195342 A1 | 8/2011 | Luo et al. | |

FOREIGN PATENT DOCUMENTS

| | | |
|---|---|---|
| CA | 2428200 | 5/2002 |
| CA | 2610686 | 6/2008 |
| WO | 2008131551 | 11/2008 |

OTHER PUBLICATIONS

Azizi, Y. et al., "Formation of polymer-grade ethylene by selective hydrogenation of acetlyene over Au/CeO2 catalyst", (2008), 256(2), pp. 345-348.

Baerns, M. et al., "Simple Chemical processes based on low molecular-mass alkanes as chemical feedstocks", (1997), 45, pp. 13-22.

(Continued)

*Primary Examiner* — Stephen J. Kalafut
(74) *Attorney, Agent, or Firm* — Anthony R. Lambert

(57) ABSTRACT

Anode catalysts for conversion of hydrocarbon feeds in solid oxide fuel cell membrane reactors. An anode catalyst may be a mixture of a metal with a metal oxide, for example a mixture of copper or copper-nickel alloy or copper-cobalt alloy with $Cr_2O_3$. Mixed oxides can be prepared by dissolving into water soluble salts of the different metals, chelating the metal ions with a chelating agent, neutralizing the solution, removing water by evaporation to form a gel which then is dried, and finally heating the dried gel to form a mixed oxide of the different metals. The chelating agent can be citrate ions, and ammonia can be added to the solution until the pH of the solution is about 8. The mixed oxide so formed then is reduced, for example by hydrogen, to form a composite comprising the metal (Cu, Cu—Co, Cu—Ni) and metal oxide, here $Cr_2O_3$. Typically, the composite oxides so formed comprise approximately spherical nanoparticles, and the reduced composites are nanoparticles comprising very small particles of the metal within a network of the oxide, $Cr_2O_3$.

7 Claims, 6 Drawing Sheets

(56) References Cited

OTHER PUBLICATIONS

Kameoka, S. et al., "Preparation of a Novel Copper Catalyst in Terms of the Immiscible Interaction Between Copper and Chromium", (2008), 120(3-4), pp. 252-256.

Park, S.D. et al., "Direct oxidation of hydrocarbons in a solid-oxide fuel cell", (2000), Nature, 404(6775), pp. 265-268.

Shao, Z. et al., "A thermally self-sustained micro solid-oxide fuel-cell stack with high power density", (2005), Nature, 435 (7043), pp. 795-798.

Shi, Z.C. et al., "Protonic membrane for fuel cell for co-generation of power and ethylene", (2008), 176(1), pp. 122-127.

Sun, C.W., et al., "Recent anode advances in solid oxide fuel cells", (2007), Journal of Power Sources, 171(2), pp. 247-260.

Zuo, C. et al., "$Ba(Zr0.1Ce0.7Y0.2)O_3$-$\delta$ as an Electrolyte for Low-Temperature Solid-Oxide Fuel Cells", Advanced Materials, 18(24), pp. 3318-3320, (2006).

Barison et al. 2008. Barium Non-Stoichiometry Role on the Properties of $Ba_{(1+X)}Ce_{0.65}Zr_{0.20}Y_{0.15}O_{(3-\omega)}$ Proton Conductors for IT-SOFCs. Fuel Cells 8 online, Oct. 26, 2009.

Barison et al. 2008. High conductivity and chemical stability of $BaCe_{1-x-y}Zr_xY_yO_3$-delta proton conductors prepared by a sol-gel method. J. Mat. Chem.18:5120-5128.

Bi et al. 2008. Preparation of an extremely dense $BaCe0.8Sm0.2O_3$-$\delta$ thin membrane based on an in situ reaction. Electrochem. Commun. 10:1005-1007.

Bodke et al. 1999. High selectivities to ethylene by partial oxidation of ethane. Science 285:712-715.

Cable et al. 2007. A symmetrical, planar SOFC design for NASA's high specific power density requirements. J. Power Sources 174:221-227.

Feng et al. 2008. Propane Dehydrogenation in a Proton-Conducting Fuel Cell. J. Phys. Chem. C 112:9943-9949.

Gorte et al. 2000. Anodes for direct oxidation of dry hydrocarbons in a solid-oxide fuel cell. Adv. Mater, 12:1465-1469.

Gross et al. 2007 Recent progress in SOFC anodes for direct utilization of hydrocarbons. Journal of Materials Chemistry, 17: 3071-3077.

Guo et al. 2009. Zirconium doping effect on the performance of proton-conducting $BaZr_yCe0.8-yY0.2O_3$-$\delta$ ($0.0 \leq y \leq 0.8$) for fuel cell applications. Journal of Power Sources 193:400-407.

Hibino et al. 2000. A low-operating-temperature solid oxide fuel cell in hydrocarbon-air mixtures. Science 288:2031-2033.

Hirabayashi et al. 2004. Solid oxide fuel cells operating without using an anode material. Solid State Ionics 168: 23-29.

Liu et al. 2008. A novel anode supported $BaCe0.7Ta0.1Y0.2O_3$-delta electrolyte membrane for proton-conducting solid oxide fuel cell. Electrochemistry communications 10:1598-1601 Abstract and references online, Oct. 26, 2009.

Matsumoto et al. 2008. Intermediate-temperature solid oxide fuel cells using perovskite-type oxide based on barium cerate. Solid State Ionics 179:1486-1489.

Murray et al. 1999. A direct-methane fuel cell with a ceria-based anode. Nature 400: 649-651.

Osman et al. 2009. Heat Treatment and Characterization of Yb Doped Barium Create Prepared via Sol-Gel Method. Sains Malaysiana 38: 103-107. Abstract and references retrieved online on Oct. 26, 2009.

Serra et al. 2007. Thin $BaCe0.8Gd0.2O_3$-delta Protonic Electrolytes on Porous $Ce0.8Gd0.2O_{1.9}$—Ni Substrates. J. Electrochem. Soc. 154:B334-B340.

Su et al. 2006. Effect of co-dopant addition of the properties of yttrium and neodymium doped barium cerate electrolyte. Solid State Ionics 177:1041-1045.

Tomita et al. 2006. Chemical and redox stabilities of a solid oxide fuel cell with $BaCe0.8Y0.2O_3$-alpha functioning as an electrolyte and as an anode. Solid State Ionics 177: 2951-2956.

Vohs et al. 2009. High-Performance SOFC Cathodes Prepared by Infiltration. Adv. Mater. 21: 1-14.

Wang et al. 2007. Performance of ethane/oxygen fuel cells using yttrium-doped barium cerate as electrolyte at intermediate temperatures. J.Phys. Chem. 111: 5069-5074.

Wu et al. 2009. Nano-sized $Sm0.5Sr0.5CoO_3$—$\delta$ as the cathode for solid oxide fuel cells with proton-conducting electrolytes of $BaCe0.8Sm0.2O_{2.9}$. Electrochimica Acta 54:4888-4892.

Xian-Zhu et al. 2010. Fabrication of bi-layered proton conducting membrane for hydrocarbon solid oxide fuel cell reactors. Electrochimica Acta 55: 1145-1149.

Xie et al. 2007. An ammonia fuelled SOFC with a $BaCe0.9Nd0.1O_3$—$\delta$ thin electrolyte prepared with a suspension spray. J. Power Sources 170:38-41.

Xie et al. 2008. A modified suspension spray combined with particle gradation method for preparation of protonic ceramic membrane fuel cells. Journal of Power Sources 179: 576-583.

Xin et al. 2007. Fabrication of dense YSZ electrolyte membranes by a modified dry-pressing using nanocrystalline powders. J. Mater. Chem. 17:1627-1630.

Ye et al. 2009. Improvement of Cu—$CeO_2$ anodes for SOFCs running on ethanol fuels. Solid State Ionics 180:276-281.

* cited by examiner

ANODE CATALYSTS FOR FUEL CELL MEMBRANE REACTORS

CROSS-REFERENCE TO RELATED APPLICATIONS

This application claims the benefit under 35 USC 119(e) of U.S. provisional application 61/302,884 filed Feb. 9, 2010, the entire disclosure of which is herein incorporated by reference.

FIELD

Anode catalysts for conversion of hydrocarbon feeds in solid oxide fuel cell reactors, and more particularly for use in solid oxide fuel cell reactors for cogeneration of ethylene and power from ethane.

BACKGROUND

Hydrocarbon solid oxide fuel cells (SOFCs) have increasingly attracted much attention worldwide due to their direct conversion of chemical energy in feeds, especially feeds manufactured from fossil resources, into electrical power with high efficiency and low impact on the environment [1]. Conventional hydrocarbon SOFCs use oxygen ion conducting electrolyte, and completely oxidize hydrocarbon feed to $CO_2$ gas and $H_2O$ at the anode [2]. Several anode catalysts including ceria and perovskite containing materials have been reported for hydrocarbon oxidation in solid oxide fuel cells with oxygen ion electrolytes including yttrium stabilized zirconia (YSZ) [3].

When compared with conventional oxygen ion electrolytes, proton conductors have higher ionic conductivity due to the lower activation energy for proton conductivity at low to intermediate temperatures, offering potential for operation of proton-conducting SOFCs with higher performance, longer stability and lower cost, each of which is very important for realizing broad commercialization of SOFCs [4]. However, the reactions of hydrocarbons in the anode compartments of proton-conducting SOFCs differ from those in oxide ion conducting SOFCs because there is no oxygen source available to for deep oxidation of the hydrocarbon feed. In principle, if the anode has the capability to readily dehydrogenate hydrocarbons, proton-conducting SOFCs have the potential to convert the feed to electrical energy and dehydrogenated chemicals since the protonic electrolyte primarily or solely conducts protons from the anode to the cathode. Therefore, the SOFC can also serve as a dehydrogenation membrane reactor, and operate as a fuel cell membrane reactor to co-generate power and a dehydrogenated product.

Hydrocarbons also are important feedstocks for the chemical industry. For example, ethylene, which usually is obtained in commercial quantities via steam cracking of ethane or other hydrocarbon feedstocks, is a major intermediate for production of polymers and petrochemicals. In the ethane steam cracking process a significant amount of ethane feed is burned to provide energy for this high endothermic dehydrogenation reaction. In order to reach high reaction temperature significant amounts of GHG are also emitted. Alternative methods, in particular oxidative dehydrogenation of ethane to ethylene, have been intensively researched. During ethane oxidative dehydrogenation substantial amounts of ethane unavoidably are deeply oxidized to $CO_2$ and the chemical energy from the conversion of hydrogen is not easily recovered as high grade energy [5]. Further, oxidative methods may also produce acetylene, which is very detrimental to manufacture of polymers as it poisons the catalysts and so must be removed to form high purity ethylene feed, an expensive process [6].

In contrast, electrochemical dehydrogenation of ethane to ethylene in proton conducting SOFC reactors is potentially more selective than oxidative processes, allows recovery of high grade energy, and generates little or no pollutants [7, 8]. To achieve a high reaction rate and high current density, SOFCs are operated at the maximum sustainable temperature. Electrochemical oxidative dehydrogenation of alkanes to alkenes in proton-conducting polymer membrane fuel cells at temperatures lower than 155° C. [9], effects low conversion of alkane and low current densities, as there is low catalytic activity for alkane dehydrogenation and low proton conductivity under those conditions. Therefore it is desirable to develop materials and processes for operation of proton conducting fuel cells at high temperatures such as proton conducting solid oxide fuel cells.

To date, very few anode catalysts have been investigated for conversion of hydrocarbon feeds in proton conducting solid oxide fuel cells. In prior art fuel cells [7, 8, 10] Pt was used as the active anode catalyst in ethane solid oxide fuel cell membrane reactors and obtained good power density and ethylene selectivity. However Pt is expensive and, over time, is poisoned by carbon deposition at high fuel cell operating temperatures. Therefore it is desirable to develop stable anode catalysts for conversion of hydrocarbons at high rates in SOFCs, and that they be more resistant than Pt to formation of carbon deposits.

SUMMARY

In an embodiment, there are provided dehydrogenation anode catalysts for conversion of hydrocarbons, and in particular conversion of ethane in proton conducting SOFC membrane reactors. One aspect of the catalysts relates to composite dehydrogenation anode catalysts comprising nanocomposite copper-chromium oxide, and composites comprising chromium oxide and an alloy of copper and cobalt, or chromium oxide and an alloy of copper and nickel. Methods are also provided to make the dehydrogenation anode composite catalysts. Proton conducting fuel cell membrane reactors are also provided using these dehydrogenation anode catalysts for conversion of ethane to ethylene and electrical power.

DESCRIPTION OF THE FIGURES

There will now be described embodiments of the catalysts and fuel cell reactors with reference to the drawings by way of example, in which.

DETAILED DESCRIPTION

Figure 1:
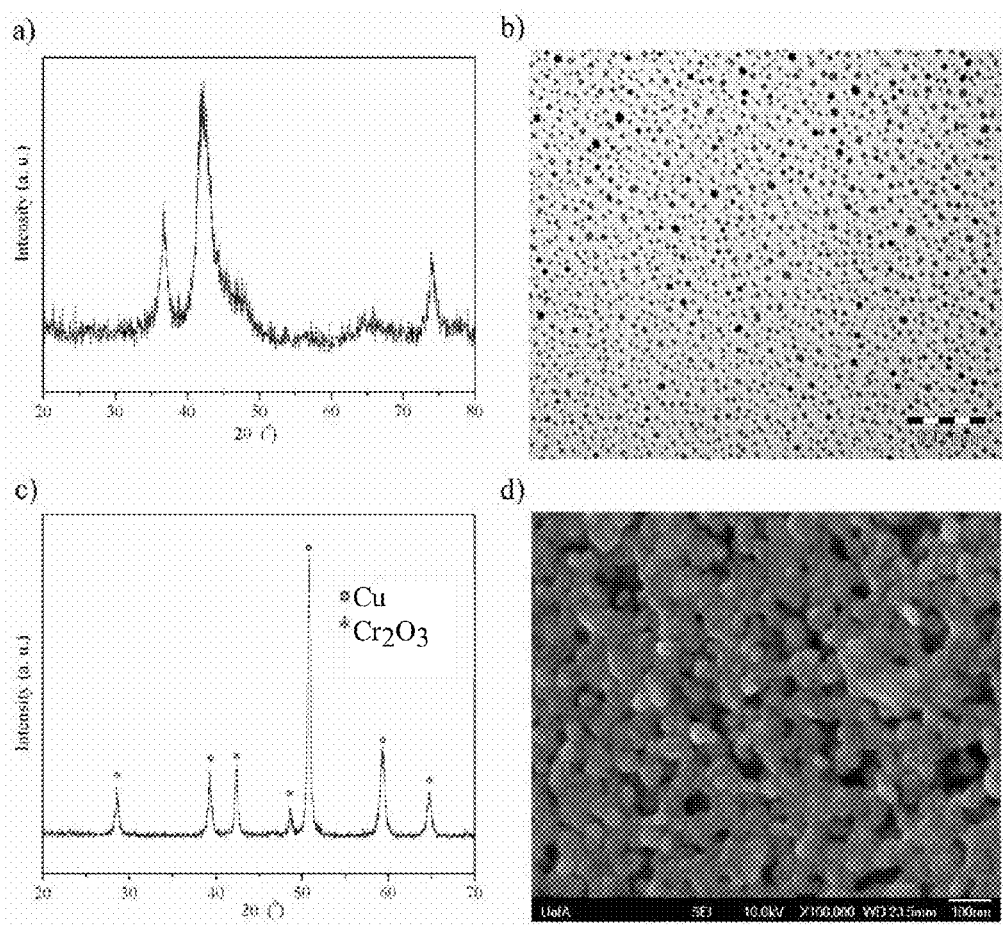
FIG. 1 shows: a) XRD pattern and b) TEM image of as-prepared $CuCrO_2$; c) XRD pattern of $CuCrO_2$ after reduction to form $Cu$—$Cr_2O_3$; d) SEM image of $Cu$—$Cr_2O_3$ anode catalyst after use in an ethane fuel cell.

A preferred anode catalyst is mixture of a metal with a metal oxide, preferably a mixture of copper or copper-nickel alloy or copper-cobalt alloy with $Cr_2O_3$. For example, mixed oxides can be prepared by dissolving into water soluble salts of the different metals, chelating the metal ions with a chelating agent, neutralizing the solution, removing water by evaporation to form a gel which then is dried, and finally heating the dried gel to form a mixed oxide of the different metals. The chelating agent can be citrate ions, and ammonia can be added to the solution until the pH of the solution is about 8. The mixed oxide so formed then is reduced, for example by hydrogen, to form a composite comprising the metal (Cu, Cu—Co, Cu—Ni) and metal oxide, here $Cr_2O_3$. Typically, the composite oxides so formed comprise approximately spherical nanoparticles, and the reduced composites are nanoparticles comprising very small particles of the metal within a network of the oxide, $Cr_2O_3$.

Anode Materials

Exemplary anode catalysts can be generally written as M—$Cr_2O_3$, in which M can be Cu alone or Cu—Co alloy or Cu—Ni alloy. The weight ratio of M to $Cr_2O_3$ is in the range 50:50 to 90:10. The molar ratio of Cu to Co or Ni in the respective alloys is in the range 95:5 to 50:50.

The methods to prepare the composite anode catalysts could be prepared according to three different procedures:

mixing separately prepared Cu or Cu alloy and $Cr_2O_3$;

reducing a mixture of metal oxides to form a composite comprising metal and $Cr_2O_3$; or preparing mixed oxides to form anode catalysts precursors which then are reduced.

In method (1) each of the metal component and $Cr_2O_3$ are prepared separately and then the solid components are mixed. Preferably, the materials are nanopowders, comprising nanoparticles having dimensions up to about 50 nanometers. Details of preparation of $Cr_2O_3$ nanopowders are described in EXAMPLE A1.

In method (2) a mixture of powdered oxides is combined, mixed, and then reduced. Typically, the method produces an intimate mixture of separate particles of the metal (e.g. Cu, Cu—Co, Cu—Ni) and $Cr_2O_3$.

In method (3), mixed oxides are prepared by dissolving into water soluble salts of the different metals, chelating the metal ions with a chelating agent, neutralizing the solution, removing water by evaporation to form a gel which then is dried, and finally heating the dried gel to form a mixed oxide of the different metals. In EXAMPLES 2 through 5, the chelating agent is citrate ions, and ammonia is added until the pH of the solution is about 8. The mixed oxide so formed then is reduced, for example by hydrogen, to form a composite comprising the metal (Cu, Cu—Co, Cu—Ni) and metal oxide, here $Cr_2O_3$. Typically, the composite oxides so formed comprise approximately spherical nanoparticles, and the reduced composites are nanoparticles comprising very small particles of the metal within a network of the oxide, $Cr_2O_3$.

Preparation of nanocomposite Cu—$Cr_2O_3$ from $CuCrO_2$ precursor is described in EXAMPLE A2. XRD showed that the mixed Cu—Cr oxide precursor had a single phase structure (FIG. 1a), and TEM showed that it comprised nanoparticles (FIG. 1b). When this material was reduced, Cu ions were reduced to metallic Cu (XRD, FIG. 1c), and the product was Cu—$Cr_2O_3$ in which very small particles of Cu were dispersed throughout a net of $Cr_2O_3$ (FIG. 1d). It was found that the nanonet structure of Cu—$Cr_2O_3$ not only provided excellent electron conduction by metallic Cu, embedding the particles of Cu in $Cr_2O_3$ also provided good resistance to metallic Cu sintering at high temperatures typical of those required for operating a SOFC reactor.

Figure 2:
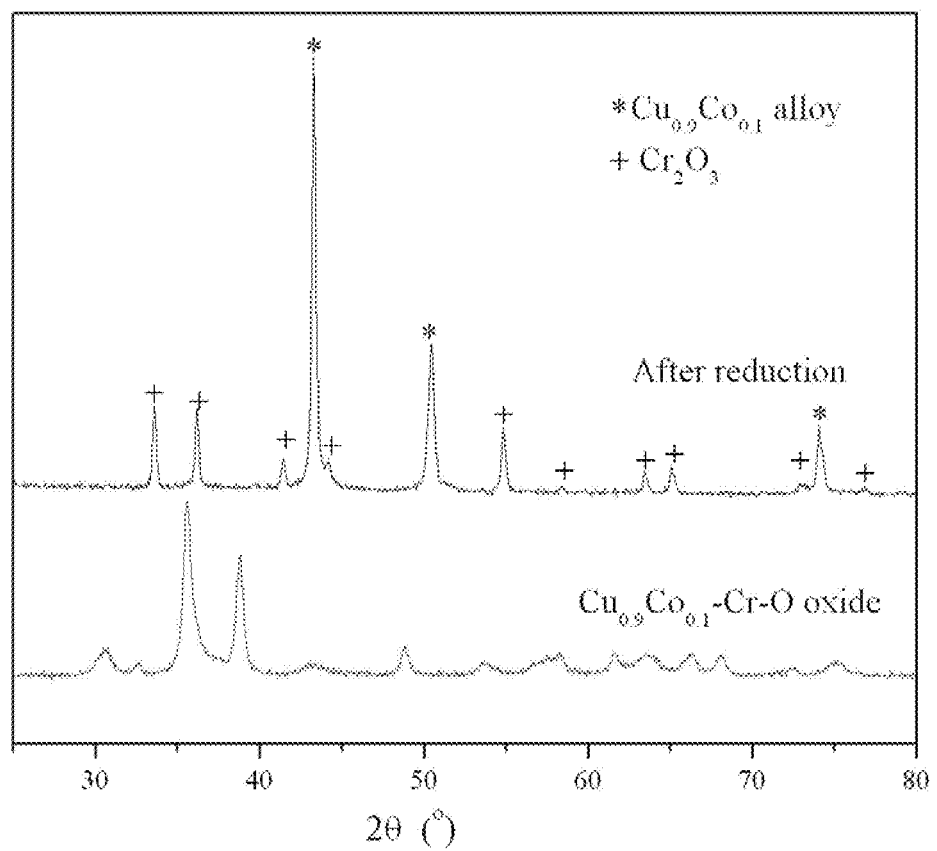
FIG. 2 compares the XRD patterns of $Cu_{0.9}Co_{0.1}$—$Cr$—$O$ oxide and the composite $Cu_{0.9}Co_{0.1}$—$Cr_2O_3$ formed by reduction of the oxide in 10% $H_2$ at 600° C. for 2 h.

Other mixed oxide anode catalyst precursors were prepared from the corresponding combinations of Cu, Cr and either Co or Ni soluble ionic compounds as described in EXAMPLES A3-A5. The mixed oxides were reduced to form the corresponding metal (e.g. Cu—Co, Cu—Ni alloys)-metal oxide composite materials. FIG. 2 compares the XRD patterns of $Cu_{0.9}Co_{0.1}$—Cr—O oxide and the composite $Cu_{0.9}Co_{0.1}$—$Cr_2O_3$ formed by reduction of the oxide in 10% $H_2$ at 600° C. for 2 h. Again, the mixed oxide catalyst precursor had a single phase structure, whereas the reduced material comprised metallic $Cu_{0.9}Co_{0.1}$ alloy dispersed throughout $Cr_2O_3$.

Protonic Electrolytes

Essential to the performance of the proton conducting SOFCs is that the electrolyte has high proton conductivity. Further, as the process desired is selective conversion of the feed to product without formation of significant amounts of side reactions, for example formation of carbon oxides, it is necessary that the electrolyte have little or no oxide conductivity. Additionally, the interface between the anode and electrolyte must be physically and chemically stable, and must allow proton conductivity between the phases. It was found that $BaCe_{0.8}Y_{0.15}Nd_{0.05}O_{3-\delta}$ (BCYN) and $BaCe_{0.7}Y_{0.2}Zr_{0.1}O_{3-\delta}$ (BCYZ) each had similar expansion coefficients and were chemically stable when used in membrane electrode assemblies (MEA) with the M—$Cr_2O_3$ anode materials (M=Cu, Cu—Co, Cu—Ni).

Fuel Cells

Figure 3:
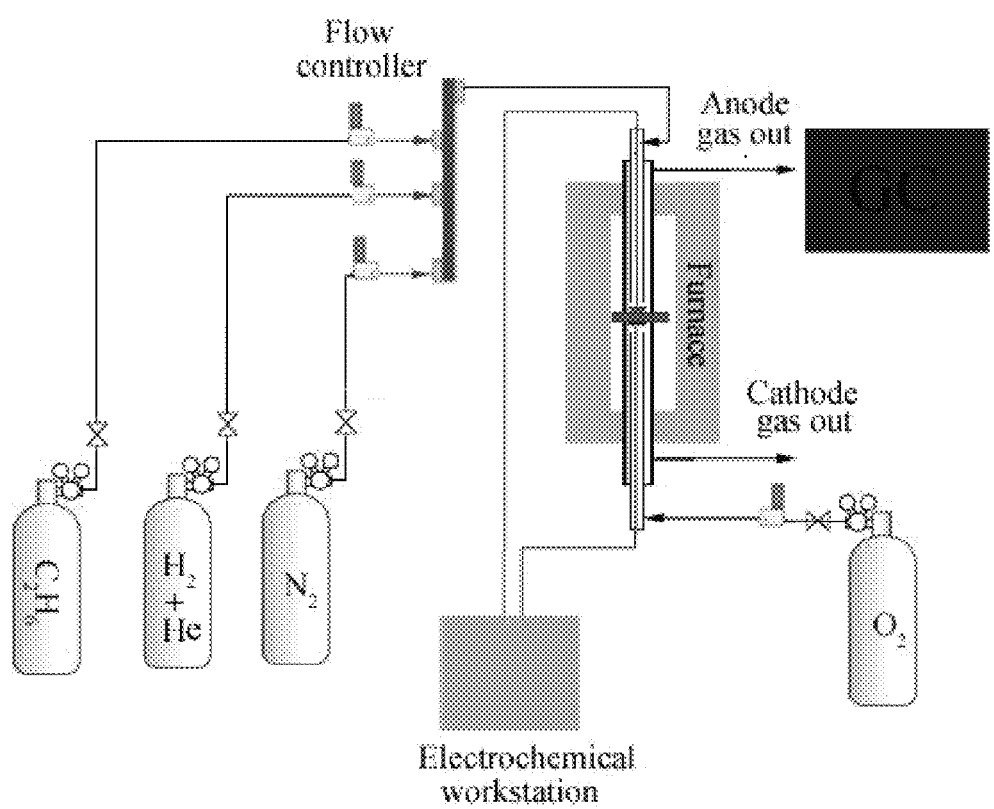
FIG. 3 is a schematic diagram of the fuel cell membrane reactor set-up and test system. GC is a gas chromatograph.

The use of M—$Cr_2O_3$ anode material (M=Cu, Cu—Co, Cu—Ni) catalysts in MEA and their performance for conversion of ethane to cogenerate ethylene and power in proton conducting solid oxide fuel cell membrane reactors (FIG. 3) is described in EXAMPLES B1-B5.

It was found that composite metal-metal oxide catalysts prepared using method (3) had superior catalytic performance, conductivity and stability against sintering of the Cu content than either of mixed catalysts prepared using methods (1) or (2).

When compared to electrochemical oxidative dehydrogenation of alkane at temperatures lower than 155° C. (Canadian Patent 2428200), conversion of alkane to alkene in proton-conducting SOFCs at temperatures at least 500° C. has higher alkane conversion and power density, since operation of proton conducting SOFCs at high temperatures provides much higher catalytic activity for alkane dehydrogenation and higher proton conductivity.

An intimate mixture of 40% $Cr_2O_3$ and 60% Cu powders dispersed in terpineol, mixed with 10% polyethylene glycol (PEG) as screen printing binder, formed a paste which was screen printed onto one polished face of a disk of BCYN electrolyte and dried under infrared light to form 0.5 $cm^2$ anodes; the cathode catalyst was Pt. The resulting MEA was fed with ethane (100 mL $min^{-1}$) into the anode compartment and oxygen (100 mL $min^{-1}$) into the cathode compartment. The power density of the fuel cell membrane reactor increased from 51 mW $cm^{-2}$ to 118 mW $cm^{-2}$ and the ethylene yield increased from about 8% to 31% when the operating temperature increased from 650° C. to 750° C.

Figure 4:
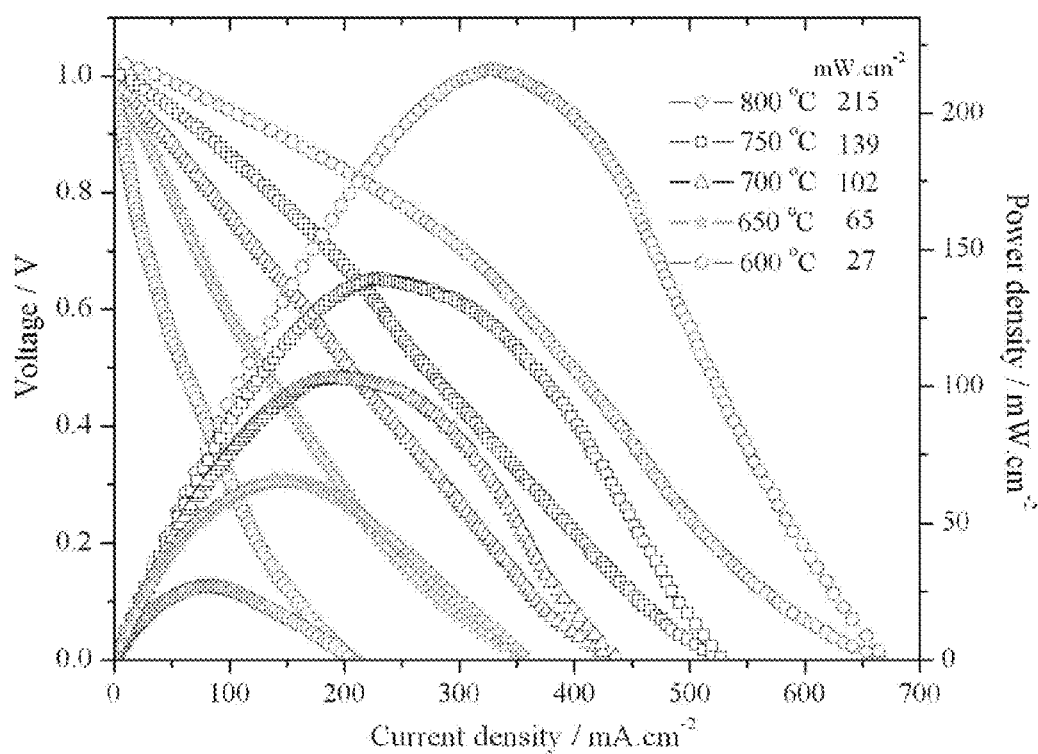
FIG. 4 is a plot of current density-voltage and power density curves of a fuel cell membrane reactor with nanocomposite $Cu$—$Cr_2O_3$ anode catalyst prepared by reduction of $CuCrO_2$ precursor.
Figure 5:
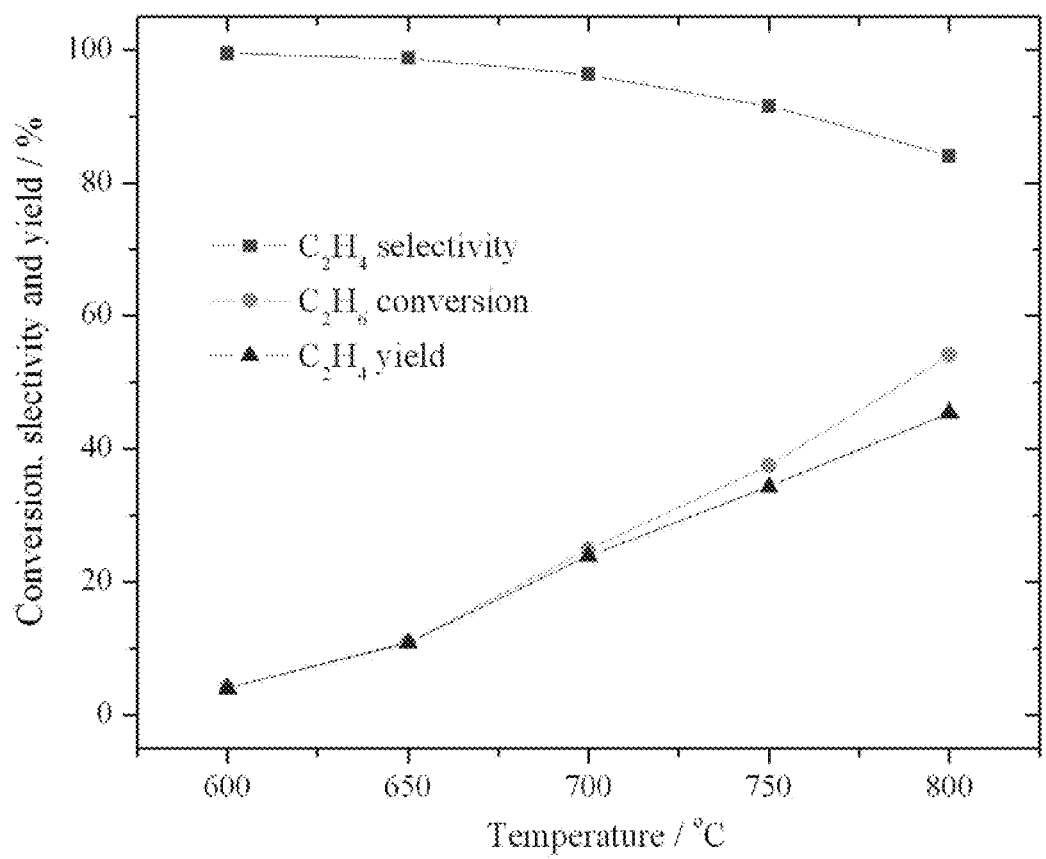
FIG. 5 shows the ethane conversion, ethylene selectivity and yield from a fuel cell membrane reactor having nanocomposite $Cu$—$Cr_2O_3$ anode catalyst prepared by reduction of $CuCrO_2$ precursor.
Figure 6:
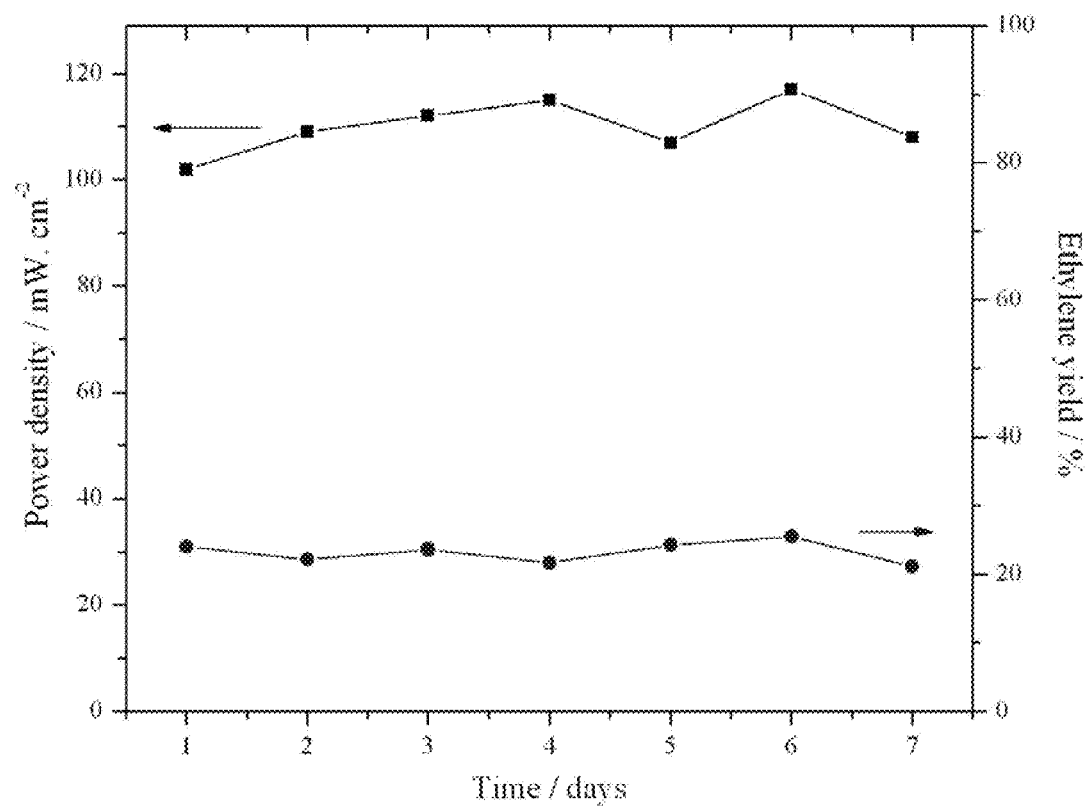
FIG. 6 illustrates the stable power density and ethylene yield of a fuel cell membrane reactor having nanocomposite Cu—$Cr_2O_3$ anode catalyst prepared by reduction of $CuCrO_2$ precursor.

A second fuel cell of similar design was assembled using BCYN as electrolyte having an anode comprising nanocomposite Cu—$Cr_2O_3$ anode catalyst prepared by reduction of $CuCrO_2$ precursor instead of the mixed anode catalyst prepared from 40% $Cr_2O_3$ and 60% Cu powders. FIG. 4 shows the dependence on temperature of current density-voltage and power density of the fuel cell membrane reactor with the nanocomposite Cu—$Cr_2O_3$ anode catalyst. The maximum power density rises from about 27 mW·cm$^{-2}$ at 600° C. to about 150 mW cm$^{-2}$ at 650° C. and about 215 mW·cm$^{-2}$ at 750 C FIG. 4). When the operating temperature of fuel cell increased from 600° C. to 800° C., the yield of ethylene increased from 4% to 47% (FIG. 5). Performance of the reactor was stable, with no obvious decrease in power density or ethylene yield during 1 week operation at 700° C. (FIG. 6).

Comparison of power densities achieved using the mixed anode material and the composite Cu—$Cr_2O_3$ anode demonstrated the improvement in performance from use of the composite catalyst prepared by reduction of the precursor mixed metal oxide.

When $Cu_{0.9}Co_{0.1}$—Cr—O oxide powder was reduced it formed $Cu_{0.9}Co_{0.1}$—$Cr_2O_3$ nanocomposite anode catalyst. Ethane (100 mL min$^{-1}$) was fed to the anode compartment and oxygen (100 mL min$^{-1}$) was fed to the cathode compartment of the fuel cell having a MEA with this catalyst. The power density of the fuel cell reactor increased from 56 mW·cm$^{-2}$ to 137 mW·cm$^{-2}$ and the ethylene yield increased from about 8% to 32% when the operating temperature increased from 650° C. to 750° C. as described in EXAMPLE 3.

A similar membrane was prepared using $BaCe_{0.7}Y_{0.2}Zr_{0.1}O_{3-\delta}$ (BCYZ) perovskite as electrolyte and $Cu_{0.5}Co_{0.5}$—$Cr_2O_3$ as anode catalyst. When ethane (100 mL min$^{-1}$) was fed to the anode compartment and oxygen (100 mL min$^{-1}$) was fed to the cathode compartment the power density of the fuel cell membrane reactor increased from 62 mW·cm$^{-2}$ to 198 mW·cm$^{-2}$ and the ethylene yield increased from about 7% to 38% when the operating temperature increased from 650° C. to 750° C. as described in EXAMPLE 4.

Thus there is similar performance advantage from use of BCYZ or BCYN as electrolyte. There is better performance from using the higher Co content $Cu_{0.5}Co_{0.5}$—$Cr_2O_3$ over $Cu_{0.9}Co_{0.1}$—$Cr_2O_3$.

When the electrolyte was $BaCe_{0.7}Y_{0.1}Zr_{0.1}Nd_{0.1}O_{3-\delta}$ (BCYZN) perovskite and the anode catalyst was $Cu_{0.7}Ni_{0.3}$—$Cr_2O_3$ and ethane (100 mL min$^{-1}$) was fed to the anode compartment and oxygen (100 mL min$^{-1}$) was fed to the cathode compartment, the power density of the fuel cell membrane reactor increased from 53 mW·cm$^{-2}$ to 177 mW·cm$^{-2}$ and the ethylene yield increased from about 8% to 37% when the operating temperature increased from 650° C. to 750° C. Thus BCYZN also confers good performance when used in the fuel cell reactor, and is an active anode catalyst.

It will be recognized by those skilled in the art that the formulae of the anode catalysts and electrolytes described herein are presented by way of examples. Immaterial variations may be made without departing from what is claimed.

EXAMPLES

Catalyst and Precursor Preparation

Example A1

$Cr_2O_3$ Anode Catalyst Nanopowder $Cr(NO_3)_3·6H_2O$ salt was first dissolved in deionized water. Subsequently, two moles of citric acid were added as chelating agent per mole of Cr ions. The resulting solution was adjusted to pH 8 with ammonia hydroxide and heated on a hot plate to evaporate water at 90° C. until it became dry gel, and the gel then was calcined at 400° C. for 2 h to form nanosized particles of $Cr_2O_3$.

Example A2

Nanoparticulate $CuCrO_2$ Anode Catalyst Precursor

Stoichiometric amounts of $Cu(NO_3)_2$ and $Cr(NO_3)_3·6H_2O$ salts were dissolved in water. Then, citric acid was added as chelating agent with 2:1 molar ratio to metal ions. The resulting solution was adjusted to about pH 8 with ammonium hydroxide, and then heated on a hot plate to evaporate water until the resulting gel became dry. The dried gel was calcined at 300° C. for 2 h. XRD (FIG. 1*a*) and TEM (FIG. 1*b*) show that $CuCrO_2$ precursor is pure $CuCrO_2$ phase nanopowder. XRD of the reduced material (FIG. 1*c*) shows that Cu—$Cr_2O_3$ can be reduced from $CuCrO_2$ in the reduced atmosphere of ethane fuel in the fuel cell membrane reactor. SEM (FIG. 1*d*) shows that nanocomposite Cu—$Cr_2O_3$ anode catalysts retained a nanonet structure after long-term use in a fuel cell reactor. Comparing to the mechanical mixture of Cu and $Cr_2O_3$, the Cu particle from $CuCrO_2$ has high sintering stability [11].

Example A3

$Cu_{0.9}Co_{0.1}$—Cr—O Mixed Oxide ($Cu_{0.9}Co_{0.1}$:Cr=2:1) Anode Catalyst Precursor $Cu(NO_3)_2$, $Co(NO_3)_2$ and $Cr(NO_3)_3·6H_2O$ salts were dissolved in water. The molar ratio of Cu, Co and Cr was 9:1:5. Then, citric acid was added as chelating agent with 2:1 molar ratio to total metal ions. The resulting solution was adjusted to about pH 8 with ammonium hydroxide, and then heated on a hot plate to evaporate water until the resulting gel became dry. The dried gel was calcined at 500° C. for 2 h. Nanoparticles of $Cu_{0.9}Co_{0.1}$—$Cr_2O_3$ were obtained by reducing $Cu_{0.9}Co_{0.1}$—Cr—O mixed oxide anode catalyst precursor in a reducing atmosphere at elevated temperature (FIG. 2)

Example A4

$Cu_{0.5}Co_{0.5}$—Cr—O Mixed Oxide ($Cu_{0.5}Co_{0.5}$:Cr=2:1) Anode Catalyst Precursor $Cu(NO_3)_2$, $Co(NO_3)_2$ and $Cr(NO_3)_3·6H_2O$ salts were dissolved in water. The molar ratio of Cu, Co and Cr was 5:5:5. Then, citric acid was added as chelating agent with 2:1 molar ratio to total metal ions. The resulting solution was adjusted to about pH 8 with ammonium hydroxide, and then heated on a hot plate to evaporate water until the resulting gel became dry. The dried gel was calcined at 500° C. for 2 h to form nanoparticles of $Cu_{0.9}Co_{0.1}$—Cr—O mixed oxide.

Example A5

$Cu_{0.7}Ni_{0.3}$—Cr—O Mixed Oxide ($Cu_{0.7}Ni_{0.3}$:Cr=2:1) Anode Catalyst Precursor $Cu(NO_3)_2$, $Ni(NO_3)_2$ and $Cr(NO_3)_3·6H_2O$ salts were dissolved in water. The molar ratio of Cu, Co and Cr was 7:3:5. Then, citric acid was added as chelating agent with 2:1 molar ratio to total metal ions. The resulting solution was adjusted to about pH 8 with ammonium hydroxide, and then heated on a hot plate to evaporate water until the resulting gel became dry. The dried gel was calcined at 500° C. for 2 h to form $Cu_{0.7}Ni_{0.3}$—Cr—O mixed oxide.

Examples of Fuel Cell Membrane Reactor Tests

The fuel cell membrane reactor was set up by securing the membrane electrode assemblies (MEA) between coaxial pairs of alumina tubes and sealed using ceramic sealant, which was cured by heating in a vertical Thermolyne F79300 tubular furnace. Au paste and mesh were used as current collector of anode. 10% $H_2$ (balance with He) was fed into the anode chamber as the temperature was increased from room temperature to 750° C. at 1° C.$min^{-1}$. Then, ethane was fed into anode chamber to replace 10% $H_2$ gas. Oxygen was the cathode feed. Electrochemical performance of fuel cells was measured using a Solartron 1287 electrochemical interface together with 1255B frequency response analysis instrumentation. The outlet gases from the anode chamber were analyzed using a Hewlett-Packard model HP5890 GC equipped with a packed bed column (OD: ⅛ IN.; length: 2 m; Porapak QS) operated at 80° C. and equipped with a thermal conductivity detector. The fuel cell set-up and test system are shown schematically in FIG. 3. The examples for different MEAs preparation and the corresponding test results are following:

Example B1

$BaCe_{0.8}Y_{0.15}Nd_{0.05}O_{3-\delta}$ (BCYN) perovskite electrolyte was synthesized using a solid state reaction from stoichiometric amounts of $BaCO_3$, $CeO_2$, $Y_2O_3$ and $Nd_2O_3$. Mixtures were ball-milled for 24 h, then calcined at 1300° C. for 10 h in air. The resulting materials were ball-milled again for 24 h, pressed at 5 tons into discs with a diameter of 1.86 cm and a thickness about 2 mm, and sintered at 1500° C. for 10 h in air to obtain high-density membranes. After sintering, the BCYN discs were polished. Platinum paste was applied on one side of the polished discs and dried to form 0.5 $cm^2$ electrodes, then heated at 900° C. for 30 min. An intimate mixture of 40% $Cr_2O_3$ (Example A1) and 60% Cu powders then was dispersed in terpineol mixed with 10% polyethylene glycol (PEG) as screen printing binder to form a paste which was screen printed onto the opposite face of the electrolyte and dried under infrared light to form 0.5 $cm^2$ anodes. The resulting structure was the membrane electrode assembly (MEA).

Ethane (100 mL $min^{-1}$) was fed to the anode compartment and oxygen (100 mL $min^{-1}$) was fed to the cathode compartment. The power density of the fuel cell membrane reactor increased from 51 mW $cm^{-2}$ to 118 mW $cm^{-2}$ and the ethylene yield increased from about 8% to 31% when the operating temperature increased from 650° C. to 750° C.

Example B2

$BaCe_{0.8}Y_{0.15}Nd_{0.05}O_{3-\delta}$ (BCYN) electrolyte membranes were synthesized as described in EXAMPLE B1. Platinum paste was applied on one side of the polished discs and dried to form 0.5 $cm^2$ electrodes, then heated at 900° C. for 30 min. A paste formed from the $CuCrO_2$ powder (EXAMPLE A5) was screen printed onto the other side of the BCYN disc. Au paste was used as anode current collector and heated to form the anode of the membrane electrode assembly (MEA).

Ethane (100 mL $min^{-1}$) was fed to the anode compartment and oxygen (100 mL $min^{-1}$) was fed to the cathode compartment. When the operating temperature of fuel cell increased from 600° C. to 800° C., the yield of ethylene increased from 4% to 47% (FIG. 5) and the maximum power density increased from 27 mW·$cm^{-2}$ to 215 mW·$cm^{-2}$ (FIG. 4). Performance of the reactor was stable, with no obvious decrease in power density or ethylene yield during 1 week operation at 700° C. (FIG. 6).

Example B3

$BaCe_{0.7}Y_{0.2}Zr_{0.1}O_{3-\delta}$ (BCYZ) perovskite powders were synthesized using a solid state reaction from stoichiometric amounts of $BaCO_3$, $CeO_2$, $Y_2O_3$ and $ZrO_2$. Mixtures were ball-milled for 24 h, then calcined at 1100° C. for 10 h in air. The resulting materials were ball-milled again for 24 h, pressed at 5 tons into discs with a diameter of 1.86 cm and a thickness about 2 mm, and sintered at 1550° C. for 10 h in air to obtain high-density membranes. After sintering, the BCYZ discs were polished. Platinum paste was applied on one side of the polished discs and dried to form 0.5 $cm^2$ electrodes, then heated at 900° C. for 30 min. $Cu_{0.9}Co_{0.1}$—Cr—O powder (Example A2) then was dispersed in terpineol mixed with 10% polyethylene glycol (PEG) as screen printing binder to form a paste which was screen painted onto the opposite face of the electrolyte and dried under infrared light to form 0.5 $cm^2$ anodes of the membrane electrode assembly.

Ethane (100 mL $min^{-1}$) was fed to the anode compartment and oxygen (100 mL $min^{-1}$) was fed to the cathode compartment. The power density of the fuel cell membrane reactor increased from 56 mW·$cm^{-2}$ to 137 mW·$cm^{-2}$ and the ethylene yield increased from about 8% to 32% when the operating temperature increased from 650° C. to 750° C.

Example B4

$BaCe_{0.7}Y_{0.2}Zr_{0.1}O_{3-\delta}$ (BCYZ) perovskite powders were synthesized as described in EXAMPLE B3. Platinum paste was applied on one side of the polished discs and dried to form 0.5 $cm^2$ electrodes, then heated at 900° C. for 30 min. $Cu_{0.5}Co_{0.5}$—Cr—O powder (Example A3) then was dispersed in terpineol mixed with 10% polyethylene glycol (PEG) as screen printing binder to form a paste which was screen painted onto the opposite face of the electrolyte and dried under infrared light to form 0.5 $cm^2$ anodes of the membrane electrode assembly.

Ethane (100 mL $min^{-1}$) was fed to the anode compartment and oxygen (100 mL $min^{-1}$) was fed to the cathode compartment. The power density of the fuel cell membrane reactor increased from 62 mW·$cm^{-2}$ to 198 mW·$cm^{-2}$ and the ethylene yield increased from about 7% to 38% when the operating temperature increased from 650° C. to 750° C.

Example B5

$BaCe_{0.7}Y_{0.1}Zr_{0.1}Nd_{0.1}O_{3-\delta}$ (BCYZN) perovskite powders were synthesized using a solid state reaction from stoichiometric amounts of $BaCO_3$, $CeO_2$, $Y_2O_3$, $ZrO_2$ and $Nd_2O_3$. Mixtures were ball-milled for 24 h, then calcined at 1100° C. for 10 h in air. The resulting materials were ball-milled again for 24 h, pressed at 5 tons into discs with a diameter of 1.86 cm and a thickness about 2 mm, and sintered at 1550° C. for 10 h in air to obtain high-density membranes. After sintering, the BCYZN discs were polished. Platinum paste was applied on one side of the polished discs and dried to form 0.5 $cm^2$ electrodes, then heated at 900° C. for 30 min. $Cu_{0.7}Ni_{0.3}$—Cr—O powder (Example A4) then was dispersed in terpineol mixed with 10% polyethylene glycol (PEG) as screen printing binder to form a paste which was screen painted onto the opposite face of the electrolyte and dried under infrared light to form 0.5 $cm^2$ anodes of the membrane electrode assembly.

Ethane (100 mL min$^{-1}$) was fed to the anode compartment and oxygen (100 mL min$^{-1}$) was fed to the cathode compartment. The power density of the fuel cell membrane reactor increased from 53 mW·cm$^{-2}$ to 177 mW·cm$^{-2}$ and the ethylene yield increased from about 8% to 37% when the operating temperature increased from 650° C. to 750° C.

The reactors thus disclosed provide high power density output, high ethylene selectivity, long operating stability, and low cost. In the given examples, there is no detectable acetylene production during ethane dehydrogenation over the anode catalysts in the proton conducting SOFC membrane reactors. Like results are expected from like materials. Acetylene is a poison for polymerization catalysts used in manufacture of polymers from ethylene which usually exists in the steam cracking and oxidative dehydrogenation processes.

Examples of other membrane materials that may be used include those disclosed in U.S. patent application Ser. No. 12/903,063 filed Oct. 12, 2010, the content of which is incorporated by reference. In brief, an integral ceramic membrane for a fuel cell is provided in that application, with a non-porous layer and at least a first porous layer both formed of proton conducting material. The porous and non-porous layers are sufficiently similar to avoid interruption of flow of electrons. An interface between materials with different properties can impede flow between the materials and for this reason the porous layer or layers are preferably similar to the non-porous layer in order to reduce the resistance of the flow of protons between the layers. Thus, preferably there is a contiguous extent of the same or similar material throughout the dense (impermeable to gases and liquids) and porous layers (gas permeable to allow the reaction process and exit of products, and solution permeable to deposit the catalysts). In another embodiment, one or more of the layers can contain an admixed compound which is chemically and thermally compatible with the primary compound. In a further embodiment, different layers can comprise different compounds that are chemically and electronically similar, and have about the same expansion coefficient. Each electrode layer preferably comprises the same contiguous electrolyte into which there is impregnated the active catalyst (or precursor from which the catalyst is derived). The catalysts in the different layers do not need to be the same. There can be different levels of loading of catalyst into the anode and cathode. More importantly, the anode and cathode can have catalysts of different nature. Preferably the cathode has a catalyst for activation of oxygen, for example a metal or LSM, and the anode has a catalyst for activation of ethane, for example a metal or a metal oxide. In an embodiment, the proton-conducting material may be a compound or mixture of compounds of proton conducting perovskite oxides with the formula X1-X2-O$_{3-\delta}$ where X1=Ba, Sr or mixtures thereof and X2=Ce, Zr, Y, Nd, Yb, Sm, La, Hf, Pr or mixtures thereof. The combined atomic ratio of Y, Nd, Yb, Sm and La to Ba and Sr may in an embodiment be between 0.1 and 0.3 inclusive. In an embodiment there may also be a second porous layer adjacent to and contacting the non-porous layer, the second porous layer also primarily comprising ion-conducting material, the non-porous layer being situated between the two porous layers. $\delta$ means no stoichiometric requirement on the oxygen. The anode catalysts function with other suitable membrane materials.

REFERENCES CITED

[1] Z. Shao, S. M. Haile, J. Ahn, P. D. Ronney, Z. Zhan, S. A. Barnett, Nature 435 (2005) 795.

[2] S. D. Park, J. M. Vohs, R. J. Gorte, Nature 404 (2000) 265.

[3] C. W. Sun, U. Stimming, J. Power Sources 171 (2007) 247.

[4] C. Zuo, S. Zha, M. Liu, M. Datano, M. Uchiyama, Adv. Mater. 18 (2006) 3318.

[5] M. Baerns, O. Buyevskaya, Catal. Today 45 (1998) 13.

[6] Y. Azizi, C. Petit, V. Pitchon, J. Catal. 256 (2008) 338.

[7] J. L. Luo, K. Chuang, A. R. Sanger, Paraffin Fuel Cell, Canada Patent, CA2610686 Filed Date: 2007 Nov. 15, Open to Public Inspection: 2008 Jun. 20

[8] J. L. Luo, K. Chuang, A. R. Sanger, Paraffin Fuel Cell, Canada Patent, CA2610686 Filed Date: 2007 Nov. 15, Open to Public Inspection: 2008 Jun. 20.

[9] K. T. Chuang, A. R. Sanger, J. L. Luo, S. V. Slavov, Electrochemical Process for Oxidation of Alkanes to Alkenes, Canada Patent, CA2428200 Filed Date: 2001 Nov. 9, Open to Public Inspection: 2002 May 16

[10] Z. C. Shi, J. L. Luo, S. Y. Wang, A. R. Sanger, K. T. Chuang, J. Power Sources 176 (2008) 122.

[11] S. Kameoka, M. Okada, A. P. Tsai, Catal. Lett. 120 (2008) 252.

What is claimed is:

1. A proton conducting fuel cell membrane reactor, wherein the proton conducting fuel cell membrane reactor has a proton conducting electrolyte membrane having an anode catalyst and a cathode catalyst on opposed sides of the electrolyte membrane, and current collectors to conduct electrical current between each of the anode and the cathode and an external circuit, the anode catalyst comprising a metal embedded within a metal oxide comprising Cr2O3, active for dehydrogenation of an alkane at the anode, the cathode having a catalyst for activation of oxygen reduction, so that the hydrocarbon feed is converted to a product formed by dehydrogenation of the alkane, and oxygen reacts at the cathode with protons conducted through the electrolyte and electrons conducted through the external circuit to form water, in which the proton conducting electrolytic membrane comprises a compound or mixture of compounds of the perovskite oxide proton conductor with formula X1-X2-O$_{3-\delta}$ where X1=Ba, Sr or mixtures thereof and X2=Ce, Zr, Y, Nd, Yb, Sm, La, Hf, Pr or mixtures thereof.

2. The proton conducting fuel cell membrane reactor of claim 1 where the catalyst is active for conversion of ethane to ethylene selectively with cogeneration of electrical power.

3. The proton conducting fuel cell membrane reactor of claim 1 where the metal is selected from copper, copper-cobalt alloy and copper-nickel alloy.

4. The proton conducting fuel cell membrane reactor of claim 3 where the ratio by weight of copper to cobalt in the copper-cobalt alloy is between 90:10 and 50:50.

5. The proton conducting fuel cell membrane reactor of claim 3 where the weight ratio of copper to nickel in the copper nickel alloy is between 90:10 and 50:50.

6. A proton conducting fuel cell membrane reactor for selective conversion of ethane to ethylene with cogeneration of electrical power, wherein the proton conducting fuel cell membrane reactor has a proton conducting electrolyte membrane having an anode catalyst and a cathode catalyst on opposed sides of the electrolyte membrane, and current collectors to conduct electrical current between each of the anode and the cathode and an external circuit, the anode catalyst comprising a metal embedded within a metal oxide comprising Cr2O3, active for dehydrogenation of an alkane at the anode, the cathode having a catalyst for activation of oxygen reduction, so that the hydrocarbon feed is converted to a product formed by dehydrogenation of the alkane, and oxygen reacts at the cathode with protons conducted through the electrolyte and electrons conducted through the external circuit to form water.

7. A method of converting ethane to ethylene using an anode catalyst for conversion of alkanes with cogeneration of electrical power in a proton conducting fuel cell membrane reactor, in which there is no detectable amount of acetylene in the proton conducting solid oxide fuel cell membrane reactor, wherein the proton conducting fuel cell membrane reactor has a proton conducting electrolyte membrane having an anode catalyst and a cathode catalyst on opposed sides of the electrolyte membrane, and current collectors to conduct electrical current between each of the anode and the cathode and an external circuit, the anode catalyst comprising a metal embedded within a metal oxide comprising $Cr_2O_3$, active for dehydrogenation of an alkane at the anode, the cathode having a catalyst for activation of oxygen reduction, so that the hydrocarbon feed is converted to a product formed by dehydrogenation of the alkane, and oxygen reacts at the cathode with protons conducted through the electrolyte and electrons conducted through the external circuit to form water.

* * * * *